United States Patent
Yang

(10) Patent No.: US 8,137,888 B2
(45) Date of Patent: Mar. 20, 2012

(54) METHOD OF PREPARING TONER HAVING CONTROLLED MORPHOLOGY

(75) Inventor: Xiqiang Yang, Webster, NY (US)

(73) Assignee: Eastman Kodak Company, Rochester, NY (US)

(*) Notice: Subject to any disclaimer, the term of this patent is extended or adjusted under 35 U.S.C. 154(b) by 471 days.

(21) Appl. No.: 12/342,138

(22) Filed: Dec. 23, 2008

(65) Prior Publication Data

US 2010/0159385 A1    Jun. 24, 2010

(51) Int. Cl.
G03G 9/087 (2006.01)
(52) U.S. Cl. .................. 430/137.1; 430/137.14
(58) Field of Classification Search ............... 430/137.1, 430/137.14
See application file for complete search history.

(56) References Cited

U.S. PATENT DOCUMENTS

| | | | |
|---|---|---|---|
| 4,833,060 A | 5/1989 | Nair et al. | |
| 4,933,252 A * | 6/1990 | Nishikawa et al. | 430/108.2 |
| 4,965,131 A | 10/1990 | Nair et al. | |
| 5,283,151 A | 2/1994 | Santilli | |
| 5,968,702 A | 10/1999 | Ezenyilimba et al. | |
| 6,355,392 B1 | 3/2002 | Yoon | |
| 6,380,297 B1 | 4/2002 | Zion et al. | |
| 6,416,921 B1 | 7/2002 | Wilson et al. | |
| 6,482,562 B2 | 11/2002 | Ezenyilimba et al. | |
| 7,150,952 B2 * | 12/2006 | Matsushima et al. | 430/108.1 |
| 2002/0028402 A1 * | 3/2002 | Matsuoka et al. | 430/137.1 |
| 2005/0118523 A1 * | 6/2005 | Ikami et al. | 430/137.14 |
| 2008/0107991 A1 | 5/2008 | Hamano | |
| 2008/0145779 A1 | 6/2008 | Yang et al. | |
| 2008/0145780 A1 | 6/2008 | Yang et al. | |

FOREIGN PATENT DOCUMENTS

EP    1 744 222    1/2007

* cited by examiner

*Primary Examiner* — Hoa Le
(74) *Attorney, Agent, or Firm* — Andrew J. Anderson

(57) ABSTRACT

A method for the preparation of shaped polymeric particles, and in a particular embodiment shaped electrostatographic toner particles, of controlled morphology including the following steps. A selected solvent or solvent mixture is used to dissolve a polyester polymer material to form an organic phase, wherein the polyester material is formed from at least one diol and at least one multicarboxylic aromatic acid and has a solubility parameter of greater than 9.0 $(cal/cm^3)^{1/2}$, the selected solvent or solvent mixture includes at least a first solvent having a solubility parameter of less than 9.0 $(cal/cm^3)^{1/2}$, and the difference in solubility parameters for the polyester material and the at least first solvent is between 1.0 and 3.0 $(cal/cm^3)^{1/2}$. The organic phase is dispersed in an aqueous phase containing a particulate stabilizer to form a dispersion, which is then homogenized. The organic solvent is evaporated from the dispersion to form shaped polymeric particles, and the resultant product is recovered, washed and dried.

18 Claims, 2 Drawing Sheets

METHOD OF PREPARING TONER HAVING CONTROLLED MORPHOLOGY

FIELD OF THE INVENTION

This invention relates to a method for the preparation of polymeric powders suitable for use as electrostatographic toner, and more particularly, to a method for the preparation of toner particles of controlled shape.

BACKGROUND OF THE INVENTION

Polymeric electrostatic toner particles can be prepared by a process frequently referred to as "limited coalescence". In this process, polymer particles having a narrow size distribution are obtained by forming a solution of a polymer in a solvent that is immiscible with water, dispersing the solution so formed in an aqueous medium containing a solid colloidal stabilizer and removing the solvent by evaporation. The resultant particles are then isolated, washed and dried.

In the practice of this technique, toner particles are prepared from any type of polymer that is soluble in a solvent that is immiscible with water. Thus, the size and size distribution of the resulting particles can be predetermined and controlled by the relative quantities of the particular polymer employed, the solvent, the quantity and size of the water insoluble solid particulate suspension stabilizer, typically silica or latex, and the size to which the solvent-polymer droplets are reduced by agitation.

Limited coalescence techniques of this type have been described in numerous patents pertaining to the preparation of electrostatic toner particles because such techniques typically result in the formation of toner particles having a substantially uniform size distribution. Representative limited coalescence processes employed in toner preparation are described in U.S. Pat. Nos. 4,833,060 and 4,965,131 to Nair et al.

As with other emulsion related techniques, toner particles prepared with the limited coalescence process generally tend to be spherical in shape. On the other hand, conventional toners produced with the pulverizing technique, or commonly referred to as "ground toners", are of irregular surface morphology. There have been efforts to manufacture irregular shaped toner particles with the limited coalescence process. U.S. Pat. No. 5,283,151 is representative of earlier work in this field and describes the use of carnauba wax to achieve similar toner morphology. The method comprises the steps of dissolving carnauba wax in ethyl acetate heated to a temperature of at least 75° C. and cooling the solution, so resulting in the precipitation of the wax in the form of very fine needles a few microns in length; recovering the wax needles and mixing them with a polymer material, a solvent and optionally a pigment and a charge control agent to form an organic phase; dispersing the organic phase in an aqueous phase comprising a particulate stabilizer and homogenizing the mixture; evaporating the solvent and washing and drying the resultant product.

Unfortunately, this technique requires the use of elevated temperature to dissolve the wax in the solvent and cooling the solution to precipitate the wax. The wax does not stay in solution of ethyl acetate at ambient temperature and as a result it is very difficult to scale up using this methodology.

The shapes of the toner particles are important to the performance of an electrostatic toner such as transfer and cleaning properties. Thus, for example, the transfer and cleaning efficiency of toner particles have been found to improve as the sphericity of the particles are reduced. Thus far, workers in the art have long sought to modify the shape of the evaporative limited coalescence type toner particles by means other than the choice of pigment, binder, or charge agent. Several approaches to modifying the shape of the toner particles have been disclosed in the art, and most involve the use of external chemical agents introduced into the formulation and process.

U.S. Pat. No. 5,968,702 discloses a method of employing commercially available SOLSPERSE® hyperdispersents, such as SOLSPERSE® 24000 or 20000, in the organic phase in the evaporative limited coalescence process. Toner particles of controlled morphology can be obtained.

However, it has been found that the use of these hyperdispersants may lead to toner particles of unstable charge. Particularly, when negative charging is desired, toner particles obtained using SOLSPERSE® 24000 as the shape control agent may exhibit positive or erratic tribo-charging. Unpredictable and unstable charging behavior of a toner is unacceptable in electrophotography using dry toner powder, where a uniform and stable charge of the toner particles is required.

U.S. Pat. No. 6,380,297 describes the use of commercially available surfactants in controlling toner shape. These shape-modifying agents are used after the homogenization step, and therefore an additional step of introducing these agents to the homogenized emulsion is necessary.

U.S. Pat. No. 6,416,921 to Wilson et al. describes the use of quaternary ammonium tetraphenylborate salts and a polymeric phosphonium salt for controlling morphology of the toner particles. These polymeric materials generally yield irregularly shaped toner particles while maintaining acceptable charging behavior.

U.S. Pat. No. 6,482,562 to Ezenyilimba et al. describes the use of flocculating agents as shape control addenda in the ELC process, which are typically introduced into the aqueous phase either before or after the homogenization step.

Furthermore, US 20080145779A1 entitled "Toner Particles of Controlled Surface Morphology and Method of Preparation" describes the use of certain metal carbamates that are useful to control sphericity and US 20080145780A1 entitled "Toner Particles of Controlled Morphology" describes the use of specific salts to control sphericity.

The above mentioned methods of manufacturing non-spherical toner particles all rely on the action of surface active agents during the solvent removal step. Not only do they generally require more complex manufacturing processes, often the use of these materials can cause undesired performance issues such as toner charging, dusting, and melt rheology variations.

SUMMARY OF THE INVENTION

It is now discovered unexpectedly that the use of selected organic solvents or solvent mixtures in combination with selected polyester materials in the evaporative limited coalescence process can lead to polymer particles of irregular shape. Thus the use of so-called shape control agent may be eliminated and the manufacturing process simplified.

The present invention is a method for the preparation of shaped polymeric particles, and in a particular embodiment shaped electrostatographic toner particles, of controlled morphology including the following steps. A selected solvent or solvent mixture is used to dissolve a polyester polymer material to form an organic phase, wherein the polyester material is formed from at least one diol and at least one multicarboxylic aromatic acid and has a solubility parameter of greater than 9.0 $(cal/cm^3)^{1/2}$, the selected solvent or solvent mixture includes at least a first solvent having a solubility parameter of less than 9.0 $(cal/cm^3)^{1/2}$, and the difference in solubility parameters for the polyester material and the at least first solvent is between 1.0 and 3.0 $(cal/cm^3)^{1/2}$. The organic phase is dispersed in an aqueous phase containing a particulate stabilizer to form a dispersion, which is then homogenized. The organic solvent is evaporated from the dispersion to form shaped polymeric particles, and the resultant product is recovered, washed and dried.

DETAILED DESCRIPTION OF THE INVENTION

Figure 1:
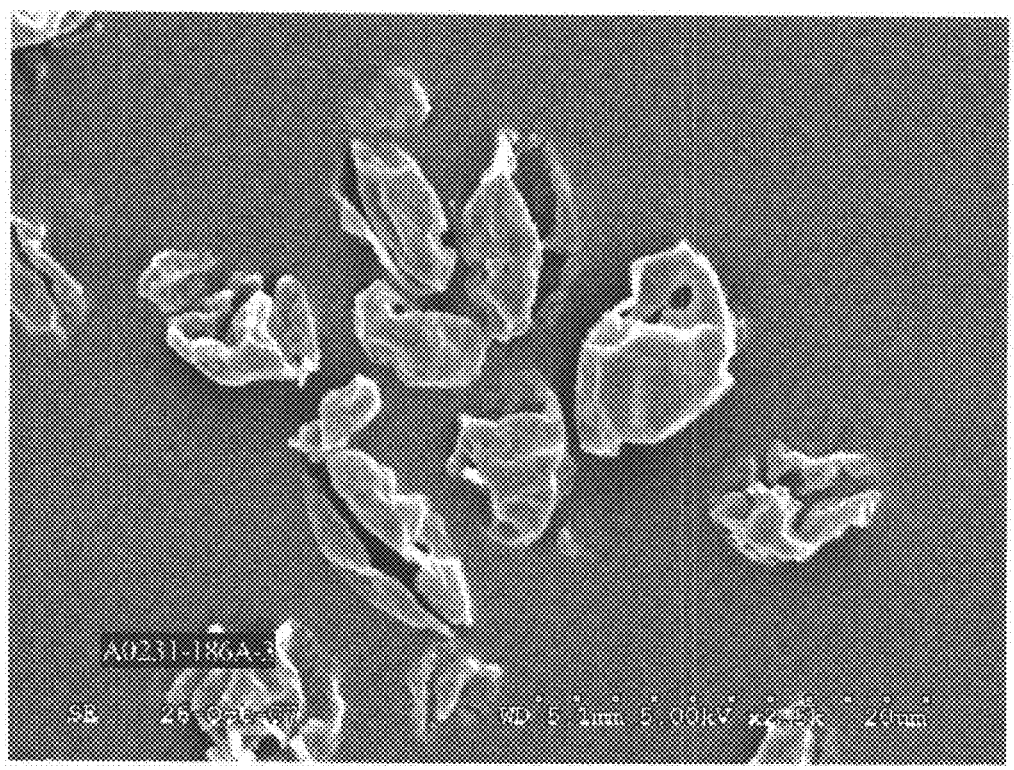
FIG. 1 is a scanning electron micrograph of clear toner particles obtained from Example 14.

The shape of toner particles is an important factor influencing the transfer and cleaning properties of an electrostatic toner. A spherical particle is defined as a three dimensional object which has all points on the surface essentially equidistant from a central point, while a non-spherical particle will have individual points on the surface having varying distances from a central point. Non-spherical particles may include irregular, flaky, oblong, or wrinkled shapes and surfaces. In the practice of the present invention, the shape of the final toner is made irregular by the use of specific organic solvents or solvent mixtures in the organic (oil) phase of an evaporative limited coalescence process.

In accordance with the present invention, an organic solvent is used to dissolve a polymeric binder material and optionally other additives such as a pigment, a wax, and a charge control agent to form an organic phase. The total solids content of the organic phase, including the polymer binder and any additives, is typically from about 10-40 weight %, preferably 15-30 weight %.

Appropriate solvents for use in the organic phase preparation step may be selected from n-propyl acetate, isopropyl acetate, and isobutyl acetate. Other solvents, with lower boiling points than that of the first solvent, can be used in combination with the first solvent, and are selected from among any of the well-known solvents capable of dissolving the polymer binder. Typical of the solvents chosen for this purpose are those with limited solubilities in water, such as chloroform, dichloromethane, methyl acetate, ethyl acetate, vinyl chloride, methyl ethyl ketone, and the like. When employing a solvent mixture, the exact ratio of the two solvents employed may be fine-tuned according to the desired reduction in sphericity for the final particles.

When optionally used, the pigment is incorporated at a concentration that ranges preferably from about 4% to 20%, by weight, the wax at from about 2% to about 15%, by weight, based upon the total weight of solids. Similarly, the charge control agent can be employed in an amount ranging from 0 to 10 percent by weight, based on the total weight of solids, with a preferred range from 0.2 to 3.0 percent.

It has been found that the polymer binder useful in the current invention is of the polyester type formed from at least one diol and at least one multicarboxylic aromatic acid, having a solubility parameter of greater than 9.0 $(cal/cm^3)^{1/2}$. Examples are the polyesters formed between alkoxylated bis-phenol A and terephthalic acid, phthalic acid, isophthalic acid, trimesic acid, and trimellitic acid, etc. For such polyester resins, Kao E and Kao N by Kao Specialties Americas LLC, a part of Kao Corporation, Japan, are particularly useful. With these polyesters as the binder, the choice of solvent may be made roughly based on the solubility parameter of the solvent and that of the polymer used. A polymer will generally dissolve in those solvents with solubility parameters close to that of the polymer itself. "Solubility parameter" is defined herein as Hildebrand's solubility parameter (represented by δ) which is a measure of the total forces holding the molecules of a solid or a liquid together. It has the units of $(cal/cm^3)^{1/2}$. Every compound is characterized by a specific value of solubility parameter. Materials having approximately the same solubility parameter tend to be miscible. Those with significantly different solubility parameters tend to be mutually insoluble. Discussions of solubility parameter concepts are presented in (1) Encyclopedia of Polymer Science and Technology, Interscience, New York (1965), Volume 3, page 833; and (2) Encyclopedia of Chemical Technology, Interscience, New York (1971), Supplement Volume, page 889.

In the present invention, the selected solvent or solvent mixture used to dissolve the polyester polymer includes at least a first solvent having a solubility parameter of less than 9.0 $(cal/cm^3)^{1/2}$, and the difference in solubility parameters for the polyester material and the at least first solvent is between 1.0 and 3.0 $(cal/cm^3)^{1/2}$. Where the difference in solubility parameter is less than 1.0 $(cal/cm^3)^{1/2}$, the solvent is typically too good a solvent of the selected polymer to result in shape upon formation of the polymer particles in the process of the invention. Where the difference is greater than 3.0 $(cal/cm^3)^{1/2}$, the solvent will typically be not a good enough solvent to function effectively in the process of the invention. In general, the higher the molecular weight of the polymer, the smaller the difference in solubility parameters between the polymer and the solvent must be. Therefore, with a low molecular weight polymer, a wider range of solvents can be used than with a higher molecular weight polymer. Solvents of lower solubility parameter scale may still dissolve the polymer binder but at a lower concentration. In the evaporative limited coalescence process, solid polymer particles are obtained by evaporating the organic solvent from the liquid emulsion. As the solvent is removed, the polymer would be precipitated at the outer surface of the organic droplet in association with the particulate stabilizer, resulting in a possible formation of polymer skin preserving the surface area of the particle and yielding irregular particle shape.

Solvents with solubility parameters 9.0 or slightly higher are good at dissolving the polyesters used in this invention. However, it is important that these solvents when employed be used as blend with those of lower solubility parameters, and they need be of lower boiling points than that of the other solvent. When a mixture of organic solvents is employed, it is preferred that the mixture comprise at least 10 weight percent of a solvent having a solubility parameter of less than 9.0 $(cal/cm^3)^{1/2}$.

In a preferred embodiment, at least a first solvent having a solubility parameter range of from about 8.0 to about 8.8 is employed. However, in view of the multiple factors involved it may often be desirable to test each solvent or blend of solvents for its effect on the polymers used in the practice of the present invention. Propyl acetate, isopropyl acetate, and a blend of these solvent with lower boiling ethyl acetate or methyl acetate have been found to be particularly useful solvents for dissolving the polymers utilized herein while still yielding particles of irregular shape. The only essential criterion for the solvent that is selected is that the specific solvent or solvent mixtures used to form the polymer solution be capable of largely dissolving the binder material.

The following Table 1 comprises a list of many of the solvents along with their solubility parameters which may be used to dissolve the polymers utilized in the present invention.

TABLE 1

Solubility Parameters of Solvents

| | Sol. Par. (cal/cm$^3$)$^{1/2}$ | b.p. ° C. |
|---|---|---|
| 1,2-dichloropropane | 9.0 | 96 |
| 2,2-dichloropropane | 8.2 | 69.3 |
| Carbon tetrachloride | 8.6 | 76.7 |
| Methyl isobutyl ketone | 8.4 | 117 |
| Methyl propyl ketone | 8.7 | 102.2 |
| Methyl isopropyl ketone | 8.5 | 93 |
| Sec. butyl acetate | 8.1 | 112 |
| Isobutyl acetate | 8.3 | 118 |
| Isopropyl acetate | 8.4 | 89 |
| Butyl acetate | 8.5 | 126 |
| Propyl acetate | 8.8 | 101.6 |
| Ethyl acetate | 9.1 | 77.1 |
| Methyl acetate | 9.3 | 56.9 |

In one embodiment of the present invention, the solvent isopropyl acetate is used to dissolve a polyester binder obtained from Kao Specialties Americas LLC, a part of Kao Corporation, Japan. After dispersing the oil phase into an aqueous phase containing silica stabilizer, homogenization, and solvent removal under vacuum, one is afforded solid polymer particles of irregular, non-spherical shape.

In another embodiment of the present invention, a solvent mixture of ethyl acetate and isopropyl acetate is used. In the end of the evaporative limited coalescence process, again, non-spherical particles are obtained. Preferably, the amount of the isopropyl acetate in the solvent mixture is 10%, or higher, by weight.

Wax is widely employed in electrostatic toner particles as release agent for oil-less fusing applications. Generally, waxes of many different types and of different origins are useful and well-known in the art. Useful release agents in the art are low-molecular weight polyolefins such as polyethylene, polypropylene and polybutene; silicone resins which can be softened by heating; fatty acid amides such as oleamide, erucamide, ricinoleamide and stearamide; vegetable waxes such as carnauba wax, rice wax, candelilla wax, Japan wax and jojoba oil; animal waxes such as bees wax; mineral and petroleum waxes such as montan wax, ozocerite, ceresine, paraffin wax, microcrystalline wax and Fischer-Tropsch wax; and modified products thereof. Silicone waxes such as AMS-C30 and 2-5088, available from Dow Coming Corporation, are also usefully employed. Generally, these waxes are used in the amount of from about 4 to about 15 percent by weight based on the toner, and more preferably from about 6 to about 12 percent by weight based on the toner.

Besides wax, various other additives generally present in an electrostatographic toner may be added to the polymer prior to dissolution in the solvent or in the dissolution step itself, such as charge control agents. Suitable charge control agents are disclosed, for example, in U.S. Pat. Nos. 3,893,935 and 4,323,634 to Jadwin et al. and U.S. Pat. No. 4,079,014 to Burness et al., and British Patent No. 1,420,839 to Eastman Kodak. Charge control agents are generally employed in small quantities such as from about 0.1 to 10 percent by weight based upon the weight of the total solids content (weight of the toner) and preferably from about 0.2 to about 3.0 percent.

The resultant mixture from the organic and aqueous phases is then subjected to higher shear mixing or homogenization. In this process, the particulate stabilizer forms an interface between the organic globules in the organic phase. Due to the high surface area associated with small droplets, the coverage by the particulate stabilizer is not complete. Coalescence continues until the surface is completely covered by particulate stabilizer. Thereafter, no fiber growth of the particles occurs. Accordingly, the amount of the particulate stabilizer is inversely proportional to the size of the toner obtained. In other words, the size and concentration of these stabilizers control and predetermine the size of the final toner particles, and, the smaller the size and/or the higher the concentration of such particles, the smaller the size of the final toner particles. The relationship between the aqueous phase and the organic phase, by volume may range from 1:1 to approximately 9:1. This indicates that the organic phase is typically present in an amount from about 10% to 50% of the total homogenized volume.

The particulate stabilizer selected for use in the aqueous phase herein may be selected from among highly cross-linked polymeric latex materials of the type described in U.S. Pat. No. 4,965,131 to Nair et al., or silicon dioxide. Silicon dioxide is preferred. Commercially available silicon dioxide in the form of aqueous (colloidal) dispersions is preferentially employed, such as Ludox™ (30 nm) from DuPont, and Nalco 1060 (60 nm) from Nalco Chemical Company. The amount of the silica used generally ranges from 1 to 15 parts by weight based on 100 parts by weight of the total solids of the toner employed. When silicon dioxide is used, it may be optionally removed from the final toner by treatment with a strong base.

Any suitable promoter that is water soluble and affects the hydrophilic/hydrophobic balance of the solid dispersing agent in the aqueous solution may be employed in order to drive the solid dispersing agent, that is, the particulate stabilizer, to the polymer/solvent droplet-water interface. Typical of such promoters are sulfonated polystyrenes, alginates, carboxymethylcellulose, tetramethyl ammonium hydroxide or chloride, diethylaminoethyl methacrylate, water soluble complex resinous amine condensation products of ethylene oxide, urea and formaldehyde and polyethyleneimine. Also, effective for this purpose are gelatin, casein, albumin, gluten and the like or non-ionic materials such as methoxycellulose. The promoter is generally used in an amount from about 0.2 to about 0.6 parts per 100 parts, or percent by weight, of aqueous solution.

Following the homogenization treatment the solvent present is removed and the resultant product washed and dried. Removal of the solvent or solvent mixture can be accomplished by any of the means in the art. Common method used includes vacuum boiling, evaporation, and extraction.

As indicated, the present invention is applicable to the preparation of polymeric particles from polyester materials formed from at least one diol and at least one multicarboxylic aromatic acid that are useful as binder resins for electrophotography toners. This includes compositions such as, for example, polyesters formed between alkoxylated bis-phenol A and dicarboxylic aromatic acids such as terephthalic acid, phthalic acid, and isophthalic acid or tricarboxylic aromatic acids such as trimellitic acid and trimesic acid. For such polyester resins, Kao E Kao M, Kao F, and Kao N by Kao Specialties Americas LLC, a part of Kao Corporation, Japan, are particularly useful.

Pigments suitable for use in the practice of the present invention should be capable of being dispersed in the polymer, insoluble in water and yield strong permanent color.

Typical of such pigments are the organic pigments such as phthalocyanines, lithols and the like and inorganic pigments such as $TiO_2$, carbon black and the like. Typical of the phthalocyanine pigments are copper phthalocyanine, a mono-chlor copper phthalocyanine, and hexadecachlor copper phthalocyanine. Other organic pigments suitable for use herein include anthraquinone vat pigments such as vat yellow 6GLCL1127, quinone yellow 18-1, indanthrone CL1106, pyranthrone CL1096, brominated pyranthrones such as dibromopyranthrone, vat brilliant orange RK, anthramide brown CL1151, dibenzanthrone green CL1101, flavanthrone yellow CL1118, azo pigments such as toluidine red C169 and hansa yellow; and metallized pigments such as azo yellow and permanent red. The carbon black may be any of the known types such as channel black, furnace black, acetylene black, thermal black, lamp black and aniline black. The pigments are employed in an amount sufficient to provide an amount in the toner of from about 1% to 40%, by weight, based upon the weight of the toner, and preferably within the range of 4% to 20%, by weight.

Toner particles of the present invention may also contain flow aids in the form of surface treatments. Surface treatments are typically in the form of inorganic oxides or polymeric powders with typical particle sizes of 5 nm to 1000 nm. With respect to the surface treatment agent also known as a spacing agent, the amount of the agent on the toner particles is an amount sufficient to permit the toner particles to be stripped from the carrier particles in a two component system by the electrostatic forces associated with the charged image or by mechanical forces. Preferred amounts of the spacing agent are from about 0.05 to about 5 weight percent, and most preferably from about 0.1 to about 3 weight percent, based on the weight of the toner.

The spacing agent can be applied onto the surfaces of the toner particles by conventional surface treatment techniques such as, but not limited to, conventional powder mixing techniques, such as tumbling the toner particles in the presence of the spacing agent. Preferably, the spacing agent is distributed on the surface of the toner particles. The spacing agent is attached onto the surface of the toner particles and can be attached by electrostatic forces or physical means or both. With mixing, uniform mixing is preferred and may be achieved by such mixers as a high energy Henschel-type mixer which is sufficient to keep the spacing agent from agglomerating or at least minimizes agglomeration. Furthermore, when the spacing agent is mixed with the toner particles in order to achieve distribution on the surface of the toner particles, the mixture can be sieved to remove any agglomerated spacing agent or agglomerated toner particles. Other means to separate agglomerated particles can also be used for purposes of the present invention.

The preferred spacing agent is silica, such as those commercially available from Degussa, now a part of Evonik Industries, like AEROSIL® R972, and RX50, or from Wacker, like H2000. Other suitable spacing agents include, but are not limited to, other inorganic oxide particles and the like. Specific examples include, but are not limited to, titania, alumina, zirconia, and other metal oxides; and also polymer beads preferably less than 1 μm in diameter (more preferably about 0.1 μm), such as acrylic polymers, silicone-based polymers, styrenic polymers, fluoropolymers, copolymers thereof, and mixtures thereof.

The invention will further be illustrated by the following examples. They are not intended to be exhaustive of all possible variations of the invention.

The Kao Binder E, Kao Binder C, and Kao Binder N, all polyester resins, used in the examples below were obtained from Kao Specialties Americas LLC, a part of Kao Corporation, Japan. The Kao E and Kao N resins are polyesters formed between an alkoxylated bis-phenol A and a dicarboxylic aromatic acid, and have solubility parameters of approximately 10.0 and 9.9, respectively, as measured by the turbidity method (Suh, K. W.; Clarke, D. H. Polym. Sci. (1967) 5, 1671. Cohesive energy densities of polymers from turbidimetric titrations). Kao C resin is a polyester formed between an alkoxylated bis-phenol A and fumaric acid, i.e. a non-aromatic acid. Piccotoner 1221, a styrene-butylacrylate (80/20 by mole) copolymer resin, was obtained from Hercules. The blue pigment used in the Examples of this invention came of Sun Chemical, which consisted of Pigment Blue 15:3 as a flushed 40% pigment loading dispersed in a linear copolymer of fumaric acid and alkoxylated bisphenol A.

The size and shape of the particles were measured using a Sysmex FPIA-3000 automated particle shape and size analyzer from Malvern Instruments. Samples pass through a sheath flow cell that transforms the particle suspension into a narrow or flat flow, ensuring that the largest area of the particle is oriented towards the camera and that all particles are in focus. The CCD camera captures 60 images every second and these are analyzed in real time. Numerical evaluation of particle shape is derived from measurement of the area of the particle. A number of shape factors can be calculated including circularity, aspect ratio and convexity using image analysis in two dimensions. Although it is realized that these calculated shape parameters are only two-dimensional representation of the toner particles, they generally correlate with the visual irregularity of the toner particles. Thus the aspect ratio (W/L), which is the ratio of width to length of the particle, and circularity, which is defined as the circumference of circle of equivalent area divided by the actual perimeter of the particle, are reported to represent the irregularity of the toner. A circularity closer to 1 means more spherical particles, and the more elongated or rough-edged the particle is, the lower the circularity. Aspect ratios of less than 0.92, preferably less than 9.0, and circularities of less than 0.99, preferably less than 0.98, are representative of shaped, non-spherical particles.

The particle size and particle size distribution were characterized by a Coulter Particle Analyzer. The volume median value (equivalent diameter) from the Coulter measurements was used to represent the particle size of the particles described in these examples.

COMPARATIVE EXAMPLE 1

Clear Toner With Kao E and Ethyl Acetate as Solvent in Oil Phase

An organic phase was prepared using 120.0 g of ethyl acetate, and 30.0 g of Kao Binder E. This organic phase was then mixed with an aqueous mixture prepared with 211.54 g of water, 1.38 g of potassium hydrogen phthalate (KHP), 9.90 g of NALCO™ 1060 and 2.18 g of 10% promoter (poly (adipic acid-comethylaminoethanol)). This mixture was then subjected to very high shear using a Silverson L4R Mixer (sold by Silverson Machines, Inc.) followed by a Microfluidizer sold by Microfluidics. Upon exiting the microfluidizer, the ethyl acetate solvent was removed with a rotary evaporator under reduced pressure. The solid particles have a volume median size of 9.33 microns and are spherical in shape. The measured mean circularity and aspect ratio are 0.998 and 0.962, respectively.

COMPARATIVE EXAMPLE 2

Cyan Toner With Kao E and Ethyl Acetate as Solvent in Oil Phase

An organic phase was prepared using 80.00 g of ethyl acetate, 17.75 g of Kao Binder E, and 2.25 g of Sun Chemical Blue Sunfast Masterbatch. The mixture was stirred overnight with a magnetic stirrer. This organic phase was then mixed with an aqueous mixture prepared with 134.77 g of water, 0.918 g of potassium hydrogen phthalate (KHP), 11.73 g of NALCO™ 1060 and 2.58 g of 10% promoter (poly(adipic acid-comethylaminoethanol)). This mixture was then subjected to very high shear using a Silverson L4R Mixer (sold by Silverson Machines, Inc.) followed by a Microfluidizer sold by Microfluidics. Upon exiting the microfluidizer, the ethyl acetate solvent was removed with a rotary evaporator under reduced pressure. The solid particles have a volume median size of 6.23 microns and are spherical in shape.

COMPARATIVE EXAMPLE 3

Clear Toner With Kao N and Ethyl Acetate in Oil Phase

A toner was prepared the same way as in Example 2 except that the organic phase dispersion was prepared using 60.0 g of ethyl acetate and 15.0 g of Kao Binder N. The aqueous phase consisted of 103.6 g of water, 0.689 g of potassium hydrogen phthalate (KHP), 6.75 g of NALCO™ 1060 and 1.485 g of 10% promoter (poly(adipic acid-comethylaminoethanol)). The collected toner particles have a volume median size of 8.88 microns. The mean circularity and aspect ratio (W/L) are 0.999 and 0.944, respectively, indicating that the particles are spherical.

EXAMPLE 4

Clear Toner With Kao E and Ethyl Acetate and Propyl Acetate Mixture in Oil Phase The procedure in Example 2 was similarly repeated except that the organic phase dispersion was prepared using 90.0 g of ethyl acetate, 30.0 g of propyl acetate, and 30.0 g of Kao Binder E, while the aqueous phase was composed of 203.82 g of water and 1.38 g of KHP, 13.20 g of NALCO™ 1060, and 6.60 g of 10% promoter solution. The toner particles have a volume median size of 5.13 microns, and appear irregular in shape. The measured mean circularity and aspect ratio (W/L) are 0.963 and 0.707, respectively.

EXAMPLE 5

Cyan Toner With Kao E and Ethyl Acetate and Propyl Acetate Mixture in Oil Phase The procedure in Example 4 was repeated with the exception that the organic phase dispersion was prepared using 90.0 g of ethyl acetate, 30.0 g of propyl acetate, 26.63 g of Kao Binder E, and 3.37 g of Sun Chemical Sunfast Masterbatch. The toner particles have a volume median size of 5.12 microns, and a measured mean circularity of 0.973 and aspect ratio (W/L) of 0.751.

EXAMPLE 6

Clear Toner With Kao E and Isopropyl Acetate in Oil Phase

A toner sample was prepared the same way as in Example 2 with the following organic phase: 60.0 g of isopropyl acetate and 15.0 g of Kao Binder E. The aqueous phase consisted of 103.6 g of water, 0.689 g of potassium hydrogen phthalate (KHP), 6.75 g of NALCO™ 1060 and 1.485 g of 10% promoter (poly(adipic acid-comethylaminoethanol)). The resulting toner particles have a volume median size of 5.66 microns (Coulter). The particles also have a measured mean circularity of 0.972 and Aspect Ratio (W/L) of 0.853.

EXAMPLE 7-12

Cyan Toners With Kao E and Propyl Acetate and Ethyl Acetate Mixtures in Oil Phase The toner samples were prepared the same way as in Example 2 except that the organic phase dispersions were prepared using 26.63 g of Kao Binder E, 3.375 g of Sun Chemical Sunfast Masterbatch, and a total of 120.0 g of various solvent mixtures composed of different weight proportions of propyl acetate and ethyl acetate. Each aqueous phase is composed of 202.15 g of water, 1.377 g of potassium hydrogen phthalate (KHP), 17.60 g of NALCO™ 1060 and 3.87 g of 10% promoter (poly(adipic acid-comethylaminoethanol)). After the preparation process like in example 2, the toner particles have the following parameters for size and shape as in Table 2. It is clear from Table 2 that the use of a larger proportion of propyl acetate in the solvent mixture generally leads to more irregularly shaped particles as indicated by the lower aspect ratios.

TABLE 2

Size and Shape Information for Examples 7-12.

| Example | PrOAc % in Solvent | vol med | Circularity | Aspect Ratio (W/L) |
|---|---|---|---|---|
| 7 | 25.0 | 5.236 | 0.990 | 0.915 |
| 8 | 18.75 | 5.444 | 0.982 | 0.873 |
| 9 | 12.5 | 5.483 | 0.980 | 0.856 |
| 10 | 6.25 | 5.596 | 0.987 | 0.918 |
| 11 | 31.25 | 5.408 | 0.954 | 0.696 |
| 12 | 37.5 | 5.133 | 0.951 | 0.659 |

EXAMPLE 13

Clear Toner With Kao N and Propyl Acetate in Oil Phase

A toner was prepared the same way as in Example 3 except that ethyl acetate was substituted with propyl acetate. The resulting toner particles have a volume median size of 7.64 microns. The mean circularity and aspect ratio (W/L) are 0.989 and 0.897, respectively, indicating that the particles are of noticeable irregularity in shape.

EXAMPLE 14

Clear Toner With Kao E and Propyl Acetate in Oil Phase

A toner sample was prepared the same way as in Example 2 with the following organic phase dispersion: 80.0 g of propyl acetate and 20.0 g of Kao Binder E. The aqueous phase consisted of 134.77 g of water, 0.918 g of potassium hydrogen phthalate (KHP), 11.73 g of NALCO™ 1060 and 2.58 g of 10% promoter (poly(adipic acid-comethylaminoethanol)). The resulting toner particles have a volume median size of 5.02 microns (Coulter). The particles also have a measured mean circularity of 0.936 and Aspect Ratio (W/L) of 0.754. A scanning electron micrograph (SEM) shows the clear toner particles are highly irregular (FIG. 1).

EXAMPLE 15

Cyan Toner With Kao E and Propyl Acetate in Oil Phase

Figure 2:
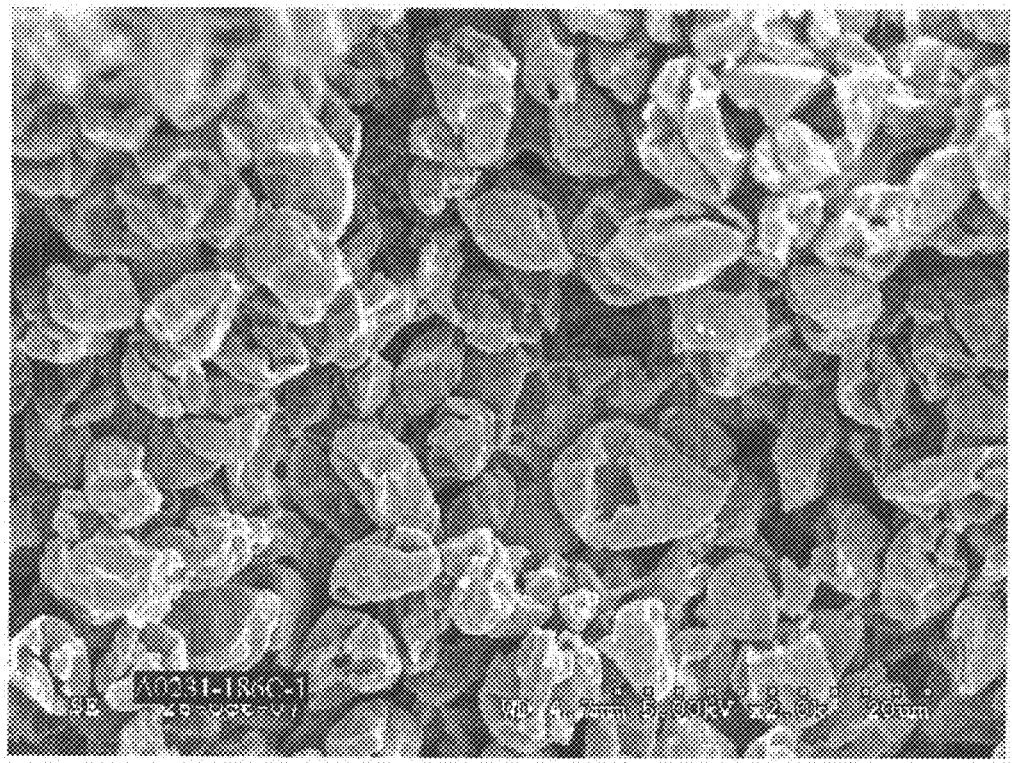
FIG. 2 is a scanning electron micrograph of cyan toner particles obtained from Example 15.

A toner sample was prepared the same way as in Example 14 with the following organic phase dispersion: 80.0 g of propyl acetate, 17.75 g of Kao Binder E, and 2.25 g of Sun Chemical Sunfast Masterbatch. The resulting toner particles have a volume median size of 4.94 microns (Coulter). The particles also have a measured mean circularity of 0.939 and Aspect Ratio (W/L) of 0.752. SEM image shows the cyan toner particles are highly irregular (FIG. 2).

EXAMPLE 16

Black Toner With Kao E and Propyl Acetate in Oil Phase

Figure 3:
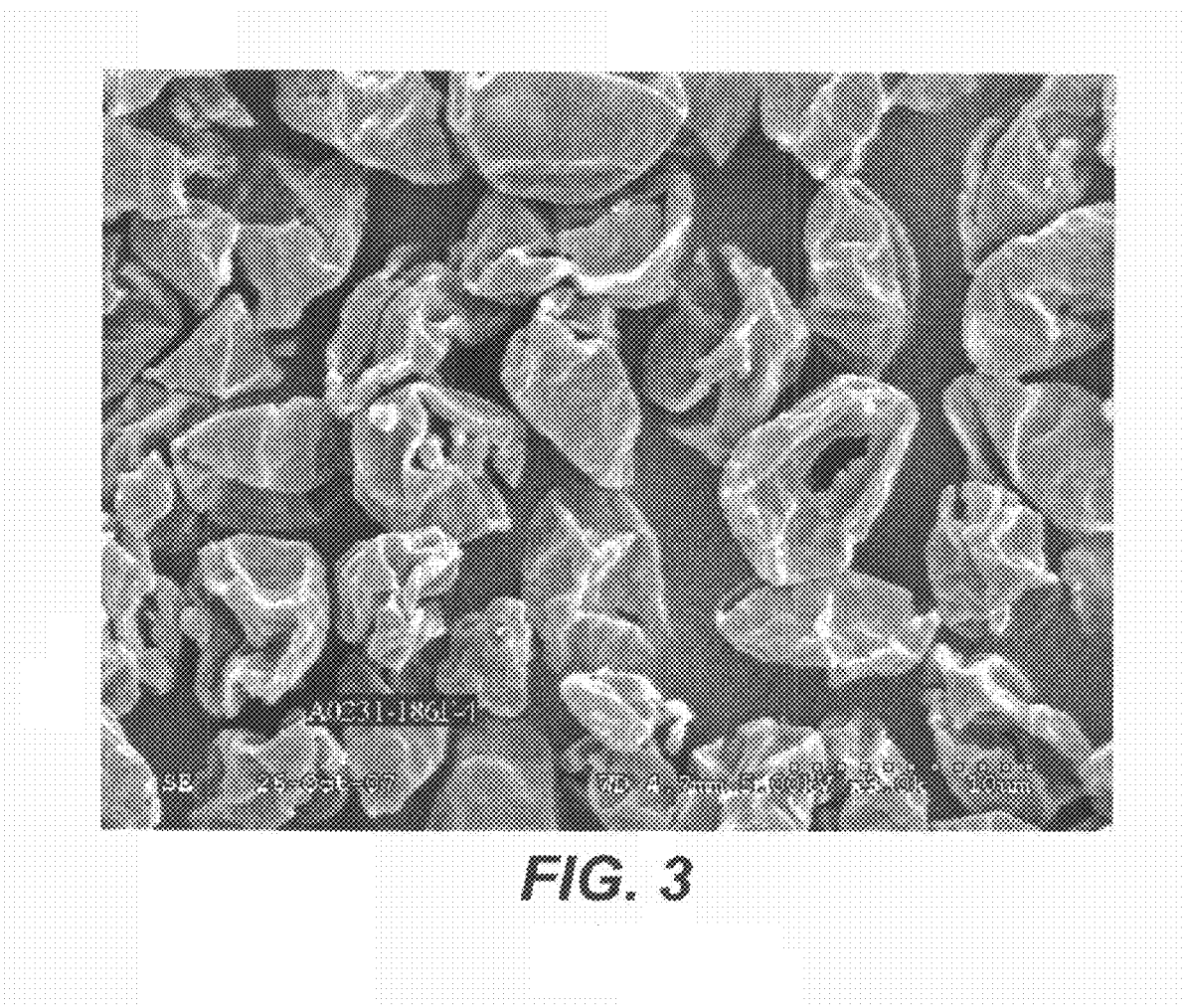
FIG. 3 is a scanning electron micrograph of black toner particles obtained from Example 16.

A toner sample was prepared the same way as in Example 14 with the following organic phase dispersion: 80.0 g of propyl acetate, 18.40 g of Kao Binder E, 0.40 g of a styrene-methacrylic acid (95:5 ratio by weight) copolymer, and 1.20 g of Black Pearls 280 (from Cabot Corporation). The resulting toner particles have a volume median size of 5.57 microns (Coulter). The particles also have a measured mean circularity of 0.939 and Aspect Ratio (W/L) of 0.743. SEM image shows the black toner particles are highly irregular (FIG. 3).

COMPARATIVE EXAMPLE 17

Clear Toner With Piccotoner 1221 as Binder and Isopropyl Acetate in Oil Phase

A toner sample was prepared the same way as in Example 14 with the following organic phase: 40.0 g of isopropyl acetate, and 10.0 g of Piccotoner 1221. The water phase contained 70.48 g of a 3% KHP solution, and 4.52 g of NALCO™ 1060. The resulting toner particles are completely spherical in shape.

COMPARATIVE EXAMPLE 18

Clear Toner With Kao C as Binder and Isobutyl Acetate in Oil Phase

A toner sample was prepared the same way as in Example 17 with an organic phase comprising 20.0 g of isobutyl acetate and 5.0 g of Kao Binder C. The aqueous phase contained 34.74 g of 3% KHP, 2.26 g of NALCO™ 1060, and 0.50 g of 10% promoter. The resulting toner particles are completely spherical in shape. This example shows that Kao Binder C, which is a polymer of fumaric acid and alkoxylated bisphenol A, gives only spherical particles with isobutyl acetate solvent.

EXAMPLE 19

Clear Toner With Kao E and Propyl Acetate in Oil Phase, Without Promoter in Aqueous Phase A toner sample was prepared with an organic phase made of 5.00 g of Kao E and 20.0 g of propyl acetate, which was then mixed with an aqueous phase that contained 35.24 g of a 3.0% KHP solution and 2.26 g of NALCO™ 1060. The resulting particles have a size of 7.1 microns and a measured circularity of 0.965 and aspect ratio (W/L) of 0.841.

COMPARATIVE EXAMPLE 20

Clear Toner With Kao C Binder and Ethyl Acetate in Oil Phase

An organic phase was prepared using 80.00 g of ethyl acetate and 20.0 g of Kao Binder C. This organic phase was then mixed with an aqueous mixture prepared with 134.77 g of water, 0.918 g of potassium hydrogen phthalate (KHP), 11.73 g of NALCO™ 1060 and 2.58 g of 10% promoter. This mixture was then subjected to very high shear using a Silverson L4R Mixer followed by a Microfluidizer. The ethyl acetate solvent was removed with a rotary evaporator under reduced pressure and the resulting toner particles are found spherical in shape.

The invention has been described in detail with particular reference to certain preferred embodiments thereof, but it will be understood that variations and modifications can be effected within the spirit and scope of the invention.

It is claimed:

1. A method for the preparation of shaped polymeric particles comprising the steps of:
   a) combining one or more organic solvents with a polyester material to form an organic phase, wherein the polyester material is formed from at least one diol and at least one multicarboxylic aromatic acid and has a solubility parameter of greater than 9.0 $(cal/cm^3)^{1/2}$, the one or more organic solvents includes at least a first solvent having a solubility parameter of less than 9.0 $(cal/cm^3)^{1/2}$, and the difference in solubility parameters for the polyester material and the at least first solvent is between 1.0 and 3.0 $(cal/cm^3)^{1/2}$;
   b) dispersing the organic phase in an aqueous phase comprising a particulate stabilizer and homogenizing the resultant mixture, wherein the particulate stabilizer is silicon dioxide;
   c) evaporating the one or more organic solvents to form shaped polymeric particles having a width/length average aspect ratio of less than 0.92; and
   d) washing and drying the resultant product.

2. The method of claim 1 wherein an electrostatographic toner charge control agent is added in step a).

3. The method of claim 1 wherein a pigment is added in step a).

4. The method of claim 1 wherein a promotor is added in step b).

5. The method of claim 1 wherein the first solvent is selected from n-propyl acetate, isopropyl acetate, and isobutyl acetate.

6. The method of claim 1 wherein the first solvent is isopropyl acetate.

7. The method of claim 1 wherein the amount of particulate stabilizer is between 1 to 15 parts based on 100 parts of total solids in the polymeric particles.

8. The method of claim 1 wherein the relationship between the aqueous phase and the organic phase, by volume, ranges from 1:1 to 9:1.

9. The method of claim 1, wherein the shaped particles have an average circularity of less than 0.99.

10. The method of claim 1 wherein the polyester material comprises a polyester formed between an alkoxylated bisphenol A and a dicarboxylic or tricarboxylic aromatic acid.

11. The method of claim 10 wherein the polyester material comprises a polyester formed between an alkoxylated bisphenol A and one or more of terephthalic acid, phthalic acid, isophthalic acid, trimellitic acid, and trimesic acid.

12. The method of claim 11, wherein the at least first solvent has a solubility parameter of from about 8.0 to about 8.8 $(cal/cm^3)^{1/2}$.

13. The method of claim 1, wherein the at least first solvent has a solubility parameter of from about 8.0 to about 8.8 $(cal/cm^3)^{1/2}$.

14. The method of claim 1, wherein the organic phase formed in step a) further comprises a second solvent, wherein the second solvent has a solubility parameter greater than that of the first solvent and a boiling point lower than that of the first solvent.

15. The method of claim 14 wherein the second solvent is selected from dichloromethane, methyl acetate, ethyl acetate, and the first solvent is selected from n-propyl acetate, isopropyl acetate, and isobutyl acetate.

16. The method of claim 14, wherein the first solvent has a solubility parameter of from about 8.0 to about 8.8 $(cal/cm^3)^{1/2}$, and the second solvent has a solubility parameter equal to or greater than 9.0 $(cal/cm^3)^{1/2}$.

17. The method of claim 14 wherein the particulate stabilizer is $SiO_2$.

18. The method of claim 14 wherein the polyester material comprises a polyester formed between an alkoxylated bisphenol A and a dicarboxylic or tricarboxylic aromatic acid.

* * * * *